June 9, 1931. J. G. LIDDELL 1,809,416
FOUNTAIN PEN
Filed July 11, 1929
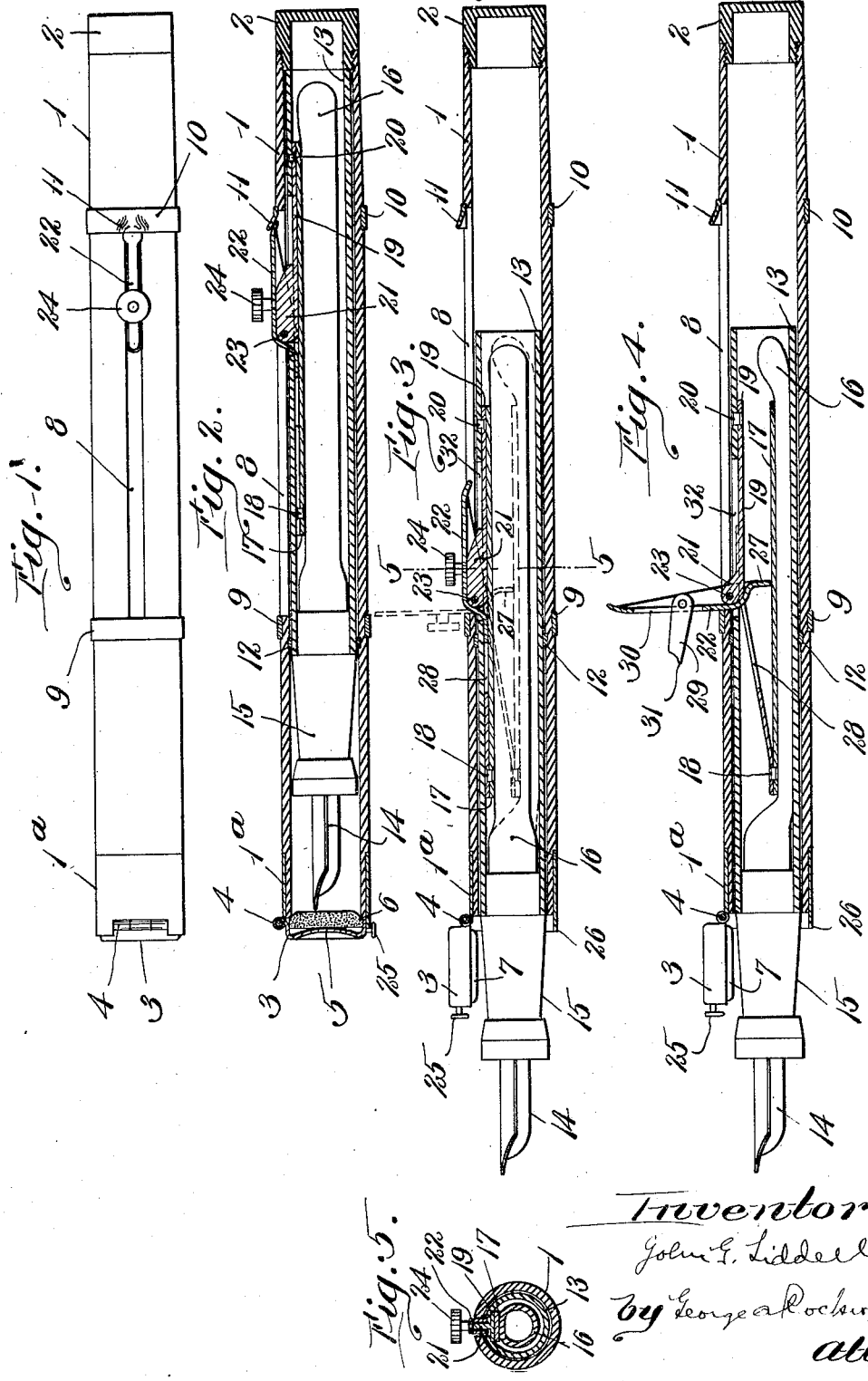
Inventor.
John G. Liddell,
by George A. Rockwell,
att'y.

Patented June 9, 1931

1,809,416

UNITED STATES PATENT OFFICE

JOHN G. LIDDELL, OF EVERETT, MASSACHUSETTS

FOUNTAIN PEN

Application filed July 11, 1929. Serial No. 377,393.

The principal objects of my invention are to make a fountain pen which is readily and quickly assembled, which is simple in manufacture, which is highly efficient and practical, whose adjustment is rapid, whose action is smooth and whose pen point protector is easily and quickly moved from protecting position and one which has no part to be removed when the pen is to be used.

A feature of my invention is that my pen point is protected by a movable, but not removable, cap which provides not only for speed when preparing to write and speed in covering the pen after writing, but also does away with the danger of losing or damaging the cap, which danger is present if a removable cap is used.

Another feature is an operating lever pivoted on a spring member, the latter functioning in connection with filling the sack with ink.

Another feature is an inner casing carrying the sack and pen and slidable within an outer casing.

Another feature is the use of the operating lever referred to above for the purpose of giving relative movement between the inner and outer casing.

Various other features will be pointed out below.

In the drawings

Figure 1 is a plan of a pen in closed position and embodying my invention;

Figure 2 is a central vertical section of the same but with some of the parts in elevation;

Figure 3 is a central section similar to that of Figure 2 but with the movable parts in a different position;

Figure 4 is a view similar to that of Figure 3 but showing a modification described below; and Figure 5 is a section on line 5—5 of Figure 3.

Outer casing or tube 1 may be of the usual material used in fountain pens and is closed at one end by member 2 threaded to engage interior threading on casing 1. At the other end of the casing 1 is a metal band 1ª frictionally held to the exterior of casing 1 and fitting in a suitable annular depression in said casing. The friction is such as to permit rotation of the band if desired.

Cap 3 is hinged to the band at 4 and is preferably of metal concaved at 5 and having an annular lip 6 within which is frictionally held a rubber pad or cushion 7 which protrudes slightly beyond said lip so as to engage the adjacent open end of the casing 1 when the cap is closed as in Figure 2 and thereby seal the end of casing 1. The outer casing 1 is slotted longitudinally at 8 and has an exterior annular depression to receive metal band 9 and another exterior annular depression to receive metal band 10, these bands being at the ends of said slot for a purpose described below and band 10 being slightly expanded at 11. The casing 1 has an interior annular depression to receive packing 12 which engages inner casing or tube 13 the latter carrying the usual pen 14, pen holder 15 and sack 16.

In order to deflate the sack I provide a flat metal member 17 to which is riveted at 18 the flat spring member 19, the latter being riveted at 20 to the inner casing 13. The member 19 has a raised portion 21 to which lever 22 is pivoted at 23. A button 24 is suitably attached to the lever for swinging the latter and also for moving the inner casing with relation to the outer casing. The lever 22 may conveniently be made U-shaped as shown in section in Figure 5 and so, when in closed position, it will straddle the portion 21.

When the device is not in use the parts occupy the position shown in Figure 2. To use the pen the cap is swung outwardly by means of button 25, the shank of which normally rests in slot 26 in the outer casing. When the cap is moved to the position of Figure 3 or to an even more open position the button 24 is moved toward the left of Figure 3 and this moves to the left the members 19 and 17 and also the inner casing and the sack and pen, the movement being limited by engagement of a portion of lever 22 with one end of slot 8. The band 1ª may be rotated so that the cap be in any desired position.

When use of the pen is no longed desired the button 24 will be moved to the right, withdrawing the pen within the outer casing, and the movement to the right will be limited by engagement of the inner casing with member 2, the end of lever 22 then riding under the expanded portion 11 which then covers the free end of the lever.

When the pen is to be filled the cap is opened and the button 24 is moved to about its position in Figure 3. The button is then used to lift the outer portion of the lever, as shown dotted in Figure 3, swinging downward the portion 27 of the lever, which engages member 17 and forces it and a portion of member 19 and the sack 16 downwardly. When the lever is swung back to the full line position of Figure 3 the resiliency of member 19 will return member 17 to normal position, the portion 27 then resting in slot 28 in member 19.

If the user should attempt to push the pen outwardly before the cap is open the pen point will engage the cushion in the cap, and the cushion, being preferably of soft rubber, will prevent damage of the pen point. The cap is conveniently held closed by frictional engagement of the lip 6 with the band 1ª.

In the form of Figure 4 I move the lever by a finger piece 29 pivoted on the lever and normally resting in slot 30 in the lever, the finger piece having an extension 31 which may be raised by the finger nail of the user. In this form the raised portion 21 is somewhat cut away and the inner casing is slotted at 32 to accommodate the lever.

What I claim is:

1. A fountain pen comprising a casing; a pen movably mounted within the casing; and a cap permanently attached to the casing but movable from closed position to permit protrusion of the pen, said cap being mounted to rotate about the longitudinal axis of the device.

2. A fountain pen comprising an outer casing having a side slot; an inner casing slidably mounted in the outer casing; a sack and pen carried by said inner casing; a member to engage and deflate the sack; a spring operatively connected with said member; and a lever mounted on said spring and operative to engage said member to force the member and spring apart, said lever being accessible through said slot for the purpose of sliding the inner casing within the outer casing.

3. A fountain pen comprising an outer casing having a side slot; an inner casing slidably mounted in the outer casing; a sack and pen carried by said inner casing; a member to engage and deflate the sack; another member operatively connected with said first-mentioned member; and a lever mounted on said other member and operative to engage the first-mentioned member to force said members apart, said lever being accessible through said slot for the purpose of sliding the inner casing within the outer casing.

4. A fountain pen comprising a casing; a pen movably mounted within the casing; a band frictionally held to the casing but rotatable about the longitudinal axis of the device; and a cap pivoted to said band but movable from closed position to permit protrusion of the pen.

JOHN G. LIDDELL.